(12) United States Patent
Evans

(10) Patent No.: US 6,893,057 B2
(45) Date of Patent: May 17, 2005

(54) THREADED PIPE CONNECTION

(75) Inventor: M. Edward Evans, Spring, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 10/284,632

(22) Filed: Oct. 31, 2002

(65) Prior Publication Data

US 2004/0084900 A1 May 6, 2004

(51) Int. Cl.$^7$ ................................................ F16L 25/00
(52) U.S. Cl. ..................................... 285/334; 285/332.4
(58) Field of Search .............................. 285/334, 332.4, 285/334.2, 334.4, 333

(56) References Cited

U.S. PATENT DOCUMENTS

| 1,932,427 | A |   | 10/1933 | Stone |   |
|---|---|---|---|---|---|
| 2,006,520 | A |   | 7/1935 | Stone et al. |   |
| 2,313,861 | A | * | 3/1943 | Caldwell | 285/332.4 |
| 3,100,656 | A | * | 8/1963 | MacArthur | 285/333 |
| 4,244,607 | A |   | 1/1981 | Blose |   |
| 4,537,428 | A | * | 8/1985 | Landriault | 285/333 |
| 4,537,429 | A |   | 8/1985 | Landriault |   |
| 4,577,895 | A | * | 3/1986 | Castille | 285/334 |
| 4,591,195 | A | * | 5/1986 | Chelette et al. | 285/332.3 |
| 4,598,455 | A | * | 7/1986 | Morris | 285/333 |
| 4,671,544 | A |   | 6/1987 | Ortloff |   |
| 4,696,498 | A |   | 9/1987 | Church |   |
| 4,703,954 | A |   | 11/1987 | Ortloff et al. |   |
| 4,893,844 | A | * | 1/1990 | Chelette et al. | 285/334 |
| 5,029,906 | A | * | 7/1991 | Chelette et al. | 285/334 |
| 5,794,985 | A | * | 8/1998 | Mallis | 285/334 |
| 6,206,436 | B1 | * | 3/2001 | Mallis | 285/334 |
| 6,254,146 | B1 |   | 7/2001 | Church |   |
| 6,494,499 | B1 | * | 12/2002 | Galle et al. | 285/334 |
| 6,550,821 | B2 | * | 4/2003 | DeLange et al. | 285/333 |
| 6,581,980 | B1 | * | 6/2003 | DeLange et al. | 285/334 |
| 2002/0130517 | A1 |   | 9/2002 | Delange et al. |   |

FOREIGN PATENT DOCUMENTS

EP 0108980 * 5/1984 .................. 285/334

* cited by examiner

Primary Examiner—David Bochna
(74) Attorney, Agent, or Firm—Browning Bushman

(57) ABSTRACT

A coupled version of a threaded connection 10 includes first threads 16, 38 and second threads, 20, 34 on both elongate tubulars 14, 30 and a coupling 45. An integral joint version 50 preferably includes a first and second tapered threads 58, 60 on each of the connected tubular bodies 54, 56. The coupling preferably includes a dope entrapment cavity in one of the connected tubulars between the first and second threads. A tapered metal seal surface is provided preferably between the first and second threads. The second thread in a preferred embodiment is a hook thread with a negative rake angle. In another embodiment, the pin ends of a coupled connection may engage, with seals provided between the first and second threads on each tubular.

49 Claims, 1 Drawing Sheet

THREADED PIPE CONNECTION

FIELD OF THE INVENTION

The present invention relates to a threaded pipe connection having tapered stepped threads and, more particularly, to a pipe connection wherein one of the threads is a wedge thread having a varying thread width along the length f the thread to limit rotation of the connected tubulars.

BACKGROUND OF THE INVENTION

Various types of threads used in the oilfield tubular business have beneficial properties. U.S. Pat. No. 1,932,427 discloses a pipe joint with buttress threads. U.S. Pat. No. 2,006,520 discloses a casing joint with substantially square threads having flanks substantially perpendicular to the axis of the connection.

The threaded pipe connection of the present invention relates to threads which use tapered stepped first and second threads on the ends of the connected tubulars. The first tapered thread is axially spaced from and has a different nominal diameter than a second taped thread on the same tubular. U.S. Pat. No. 4,537,429 discloses a tubular connection with tapered and stepped threads.

Many threaded connections include some type of nose or load shoulder for engagement with a stop surface on the opposing connection to limit the rotation and thus the axial position of the connected tubulars. Wedge threads avoid the requirement for a shoulder, since the varying width of the wedge thread replaces the nose end or shoulder to limit rotation and thus axial position of the connected tubulars.

U.S. Pat. No. 4,671,544 discloses a threaded pipe connection with tapered stepped threads on ends of the connected tubular and a seal between the stepped threads. Wedge threads are shown in FIG. 1 of the '544 Patent and hook threads as shown in FIG. 4.

U.S. Pat. No. 4,703,954 discloses a pipe connection with wedge threads as shown in FIG. 4 and a seal between the wedge threads.

Threaded pipe connections are being increasingly used in applications which require that the threads transmit very high torque, e.g., when rotating liners, a torque of 50,000 foot pounds or more must be transferred through he threaded connection in some applications. Many threads are also susceptible to galling, are difficult to make up, require the use of a special (non-API) coupling, or are not capable of reliably transmitting the various loads to the connection.

The disadvantages of the prior art are overcome by the present invention, an improved thread pipe connection having tapered stepped threads is hereinafter disclosed.

SUMMARY OF THE INVENTION

The threaded pipe connection according to the present invention includes first and second stepped threads on ends of connected tubulars. The first thread on a tubular is axially spaced from and has a different nominal diameter than a second thread on the tubular, thereby making the threads stepped threads. The first thread is a wedge thread having a varying thread width along the length of the first thread, such that the wedge threads acts to limit rotation and thus axial position of the connected tubulars. The second thread does not axially limit rotation and axial position of the connected tubulars, and accordingly may have a substantially uniform width along the length of the second thread, or may have a variable thread width controlled such that the second thread does not perform as a wedge thread to limit rotation and thus axial position at the connected tubulars. A tapered metal seal surface on the tubular may be provided between the first and second threads, such that a metal-to-metal seal fluidly isolates the first thread from the second thread. An elastomeric seal may also be provided. A dope entrapment cavity is preferably provided in at least one of the connected tubulars between the first and second threads.

Another object of the invention is to provide a coupled threaded connection having first and second stepped threads on ends of connected tubulars, with the first thread on each tubular being axially spaced from and having a different nominal diameter than a second thread on the same tubular. A space between the first and second threads on each tubular defines a sealing area for sealing engagement between that tubular and the coupling. The ends of the tubulars may engage to limit rotation and thus axial position of the connected tubulars.

It is a feature of the invention that a tubular and a connected tubular each include the first and second stepped threads, thereby forming an integral joint. In an alternate embodiment, the first and second stepped threads on the connected tubulars each engage a mating thread on a coupling, thereby forming a coupled joint.

A tapered metal seal surface having an angle of less than 4 degrees with respect to a central axis of the connection is preferred, thereby forming a highly reliable metal-to-metal seal. An elastomer seal carried on one of the connected tubulars may be provided for sealing engagement with the metal seal surface on the other of the connected tubulars.

In one embodiment, the second thread is a hook thread having a negative rake angle, while in another embodiment the second thread is a dovetail thread. In a third embodiment, the second thread is a square thread with thread flanks substantially perpendicular to a central axis of a connection. In the fourth embodiment, the second thread is a buttress thread.

It is a feature of the invention that a dope entrapment cavity is provided on one of the connected tubulars between the first and second threads. The dope entrapment cavity preferably includes a first dope entrapment cavity between the metal-to-metal seal and the first stepped thread, and a second dope entrapment cavity between the metal-to-metal sal and the second stepped thread.

In one embodiment, the first thread is a wedge dovetail thread, while in another embodiment the first thread is a square wedge thread with thread flanks substantially perpendicular to an axis of the connection.

In a preferred embodiment, at least one of the first and second stepped threads is a tapered thread, and in many embodiment, each of the first and second stepped threads is a tapered thread, which is conventional for oilfield operations.

These and further objects, features and advantages of the present invention will be apparent to those skilled in the art in view of the following detailed description, wherein reference is made to figures in the accompanying drawings.

DETAILED DESCRIPTION OF PREFERRED EMBODIMENTS

Figure 1:
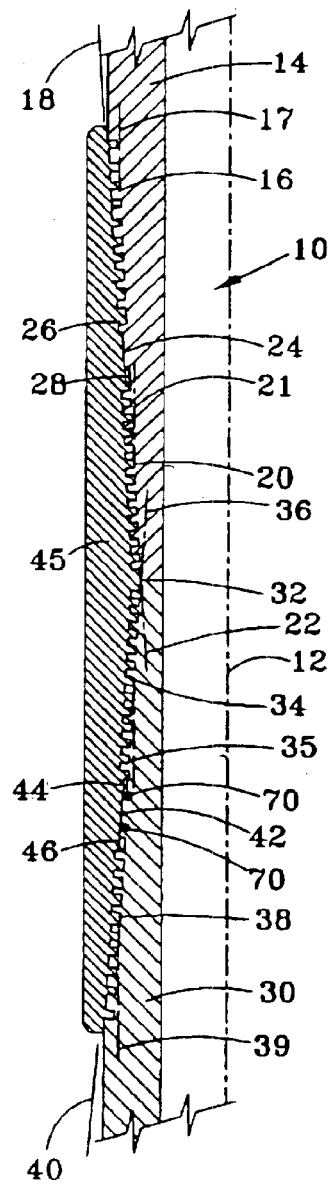
FIG. 1 is a half-sectional view of a coupled version of a threaded connection according to the present invention.

FIG. 1 illustrates a coupled version of a threaded connection 10 comprising a first elongate tubular 14, a second elongate tubular 30, and a coupling 45 each generally uniform about connection centerline 12. The elongate tubular 14 includes a first thread 16 which has a first nominal diameter 17, and a second thread 20 having a smaller nominal diameter 21. Thread 16 may be cut on a taper 18 which is angled at, e.g., 4" or less with respect to centerline 12, and thread 20 similarly may be cut at a taper at the same angle with respect to center line 12. A metal-to-metal seal 24 is formed between the elongate tubular 14 and the coupling 45, and a pair of annular grooves 26, 28 each forms a dope entrapment cavity between the metal-to-metal seal 24 and the first and second threads, respectively. The connection 10 similarly includes the first thread 38 and a second thread 34, with thread 38 having a nominal diameter 39 and thread 34 have a smaller nominal diameter 35. The first thread lies along taper 40 and the second thread lies along taper 36, as discussed above. A metal-to-metal seal 42 and dope entrapment rings 44 and 46 are also provided in the lower half of the invention. The pin ends of the connected tubulars including a wedge thread normally may be spaced from each other, since rotation of each tubular is limited by the wedge thread, as discussed below.

Figure 2:
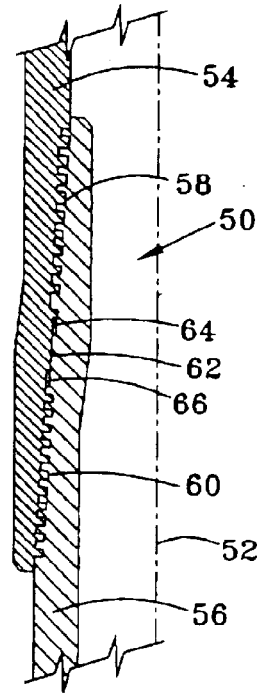
FIG. 2 is a half-sectional view of an integral joint version of a threaded connection.

The integral version of the threaded connection 50 is shown in FIG. 2. In this case, an elongate tubular 54 is joined directly to another elongate tubular 52 by a first thread 58 and the second thread 60. Again, a metal-to-metal seal surface 62 exists between the first and second threads, and at least one and preferably two dope entrapment cavities 64, 66 are provided between the seal 62 and each thread. The integral joint connection 50 as shown in FIG. 2 is thus symmetrical about axis 52.

In each of the above embodiments, the first thread is a wedge thread which includes threads having a varying width along the length of the thread, such that the wedge threads act to limit rotation and thus axial position of the connected tubulars. The second thread does not act as a wedge thread, and instead may include threads having a substantially uniform width along the length of a second thread, such that the second thread does not act to limit rotation and axial position of the connected tubulars. In an alternate embodiment, a second thread may not have a substantially uniform width along the length of the second thread, and instead may have a varying width along the length of the thread, thereby allowing substantially the same technique to be used to manufacture both the first thread and the second thread. For this alternate embodiment, however, the varying width of the second thread is controlled such that the thread nevertheless does not perform as a wedge thread, and does not act to limit rotation and axial position of the connected tubulars, and instead that function is performed by the first thread. The first and second threads are each stepped threads, meaning the threads have different nominal diameters. The first thread may be the radially outer thread and the second thread the radially inner thread, or the first thread may be the radially inner thread and the second thread the radially outer thread, depending on the application.

In a preferred embodiment, the metal seal surface 24, 42, 62 is angled less than 4" with respect to a central axis of a connection. In a preferred embodiment, the metal-to-metal seal surface is provided between the first and second threads, although in other embodiments the metal seal surfaces can be provided immediately above the upper thread or immediately below the lower thread. An elastomeric seal 70 as shown in FIG. 1 may also be provided, depending on the application. One or more elastomeric seals may be carried on one of the connected tubulars, either on a metal-to-metal sealing surface or on a thread, for sealing engagement with other of the connected tubulars.

Figure 3:
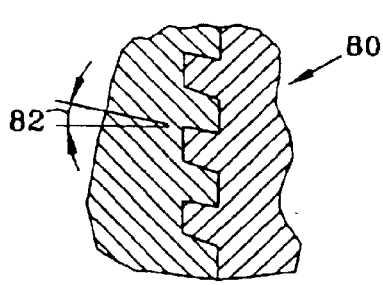
FIG. 3 illustrates a hook thread with a negative rake angle.
Figure 4:
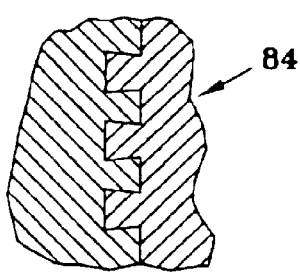
FIG. 4 illustrates a dovetail thread.
Figure 5:
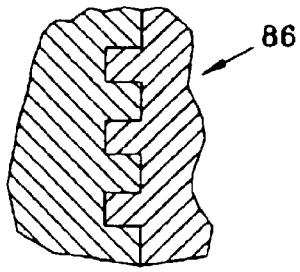
FIG. 5 illustrates a square thread.
Figure 6:
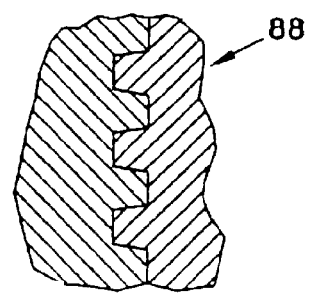
FIG. 6 illustrates a buttress thread.

In a preferred embodiment, the second thread is a hook thread with a negative rake angle, as shown in FIG. 3. Hook thread 80 thus has a rake angle 82 which is a "negative" angle compared to a conventional API thread. The second thread alternatively may be a dovetail thread 84, as shown in FIG. 4. In another embodiment, the second thread is a square thread 86, as shown in FIG. 5, with thread flanks substantially perpendicular to a central axis of the connection. Alternatively, the second thread may be a buttress thread 88, as shown in FIG. 6.

As discussed above, the first thread is the wedge thread, and one embodiment may be a dovetail thread, while another embodiment may be a square wedge thread with wedge flanks substantially perpendicular to an axis of the connection. The wedge thread may have any design that prevents rotation of one tubular member relative to other tubular member, and may also prevent radial separation of the mated threads. In a preferred embodiment, at least one of the first and second stepped threads, and preferably to the end of the first and second stepped threads, is a tapered thread, as shown in the figures. Alternatively, one or both threads could be straight threads that are not tapered relative to the axis of the connection.

When the threaded connection is a coupled connection as shown in FIG. 1, an alternate embodiment uses first and second threads on each tubular, as discussed above, but in this alternate embodiment neither the first thread nor the second thread act as a wedge thread to limit rotation and thus axial position of the connected tubulars. Instead, the axial position of these tubulars relative to each other and to the coupling 45 is controlled by the pin ends of the connected tubulars, which engage at mating face 32 as shown in FIG. 1 to limit further threading of each connected tubular to the coupling. For this embodiment, the coupled connection thus includes a first metal-to-metal seal 24 between the first and second threads on one tubular, and a second metal-to-metal seal 42 between the first and second threads on the connected tubular. In yet other embodiments, the metal-to-metal seals may be supplemented or replaced with an elastomeric seal between the first and second threads, as discussed above.

The connection of the present invention is well suited for transmitting very high torque through the connection, which is highly useful in oilfield operations for various applications, such as rotating liners or operating with top drive mechanisms. An integral joint connection is preferred due to cost savings, but a coupled version provides more material and thus more strength to the connection. As shown in the figures, the preferred embodiment of the connection uses the wedge thread to limit rotation of one tubular relative to the other, so that the connection need not include a torque shoulder or nose which butts up against a stop shoulder on the other tubular. In alternative embodiments, an optional torque shoulder may also be provided.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A threaded pipe connection having first and second stepped threads on ends of connected tubulars, the first thread on a tubular being axially spaced from and having a different nominal diameter than a second thread on the tubular, the connection comprising:

the first thread including wedge threads having a varying thread width along a length of the first thread, such that the wedge threads act to limit rotation and thus axial position of the connected tubulars; and the second thread including threads that do not act to limit rotation and axial position of the connected tubulars.

2. A threaded pipe connection as defined in claim 1, wherein the tubular and a connected tubular each include the first and second stepped threads, thereby forming an integral joint.

3. A threaded pipe connection as defined in claim 1, wherein first and second step threads on the connected tubulars each engage a mating thread on a coupling, thereby forming a coupled joint.

4. A threaded connection as defined in claim 1, further comprising:

an elastomeric seal carried on one of the connected tubulars for sealing with the other of the connected tubulars.

5. A threaded connection as defined in claim 4, wherein the tapered metal seal surface is provided between the first thread and the second thread for fluidly isolating the first thread from the second thread.

6. A threaded connection as defined in claim 1, further comprising:

a tapered metal seal surface on the tubular, such that a metal-to-metal seal fluidly isolates at least one of the first thread and the second thread from fluid.

7. A threaded connection as defined in claim 6, wherein the tapered metal seal surface has an angle of less than 4 degrees with respect to a central axis of the connection.

8. A threaded pipe connection as defined in claim 1, wherein the second thread has substantially uniform width along the length of the second thread such that the second thread does not act to limit rotation and axial position of the connected tubulars.

9. A threaded pipe connection as defined in claim 1, wherein the second thread is a hook thread with a negative rake angle.

10. A threaded pipe connection as defined in claim 1, wherein the second thread is a dovetail thread.

11. A threaded connection as defined in claim 1, wherein the second thread is a square thread with thread flanks substantially perpendicular to a central axis of the connection.

12. A threaded pipe connection as defined in claim 1, wherein the second thread is a buttress thread.

13. A threaded connection as defined in claim 1, further comprising:

a dope entrapment cavity in one of the connected tubulars between the first and second threads.

14. A threaded connection as defined in claim 13, wherein the dope entrapment cavity comprises:

a dope entrapment cavity between a metal-to-metal seal and the first stepped thread.

15. A threaded connection as defined in claim 13, wherein the dope entrapment cavity comprises:

a dope entrapment cavity between a metal-to-metal seal and the second stepped thread.

16. A threaded connection as defined in claim 13, wherein the dope entrapment cavity comprises:

a first dope entrapment cavity between a metal-to-metal seal and the first stepped thread; and a second dope entrapment cavity between the metal-to-metal seal and the second stepped thread.

17. A threaded pipe connection as defined in claim 1, wherein the first thread is a dovetail thread.

18. A threaded pipe connection as defined in claim 17, wherein at least one of the first and second stepped threads is a tapered thread.

19. A threaded pipe connection as defined in claim 1, wherein the first thread includes a square wedge thread with wedge flanks substantially perpendicular to an axis of the connection.

20. A threaded pipe connection as defined in claim 1, wherein at least one of the first and second stepped threads is a tapered thread.

21. A threaded pipe connection having first and second stepped threads on ends of connected tubulars, the first thread on a tubular being axially spaced from and having a different nominal diameter than a second thread on the tubular, the connection comprising:

the first thread including wedge threads having a varying thread width along a length of the first thread, such that the wedge threads act to limit rotation and thus axial position of the connected tubulars;

the second thread including threads that do not act to limit rotation and axial position of the connected tubulars;

a tapered metal seal surface on the tubular between the first thread and the second thread, such that a metal-to-metal seal fluidly isolates the first thread from the second thread; and a dope entrapment cavity in one of the connected tubulars between the first and second threads.

22. A threaded pipe connection as defined in claim 21, wherein the second thread has substantially uniform width along the length of the second thread such that the second thread does not act to limit rotation and axial position of the connected tubulars.

23. A threaded pipe connection as defined in claim 21, wherein the tubular and a connected tubular each include the first and second stepped threads, thereby forming an integral joint.

24. A threaded pipe connection as defined in claim 21, wherein first and second step threads on the connected tubulars each engage a mating thread on a coupling, thereby forming a coupled joint.

25. A threaded connection as defined in claim 21, wherein the tapered metal seal surface has an angle of less than 4 degrees with respect to a central axis of the connection.

26. A threaded pipe connection as defined in claim 21, wherein at least one of the first and second stepped threads is a tapered thread.

27. A threaded pipe connection as defined in claim 26, wherein each of the first and second stepped threads is a tapered thread.

28. A threaded connection as defined in claim 21, further comprising:

an elastomeric seal carried on one of the connected tubulars for sealing with the other of the connected tubulars.

29. A threaded pipe connection as defined in claim 21, wherein the second thread is one of a hook thread with a negative rake angle, a dovetail thread, a square thread with thread flanks substantially perpendicular to a central axis of the connection, and a buttress thread.

30. A threaded connection as defined in claim 21, wherein the dope entrapment cavity comprises:
   a dope entrapment cavity between the metal-to-metal seal and the first stepped thread.

31. A threaded connection as defined in claim 21, wherein the dope entrapment cavity comprises:
   a dope entrapment cavity between the metal-to-metal seal and the second stepped thread.

32. A threaded connection as defined in claim 21, wherein the dope entrapment cavity comprises:
   a first dope entrapment cavity between the metal-to-metal seal and the first stepped thread; and
   a second dope entrapment cavity between the metal-to-metal seal and the second stepped thread.

33. A threaded pipe connection as defined in claim 21, wherein the first stepped thread is one of a dovetail thread or a square wedge thread with wedge flanks substantially perpendicular to an axis of the connection.

34. A threaded pipe connection having first and second stepped threads on ends of connected tubulars, the first thread on a tubular being axially spaced from and having a different nominal diameter than a second thread on the tubular, the connection comprising:
   the first thread including wedge threads having a varying thread width along a length of the first thread, such that the wedge threads act to limit rotation and thus axial position of the connected tubulars; and
   the second thread including threads that do not act to limit rotation and axial position of the connected tubulars, the second thread being a hook thread with a negative rake angle.

35. A threaded pipe connection as defined in claim 34, wherein the second thread has substantially uniform width along the length of the second thread such that the second thread does not act to limit rotation and axial position of the connected tubulars.

36. A threaded pipe connection as defined in claim 34, wherein the tubular and connected tubular each include the first and second stepped threads, thereby forming an integral joint.

37. A threaded pipe connection as defined in claim 34, wherein first and second step threads on the connected tubulars each engage a mating thread on a coupling, thereby forming a coupled joint.

38. A threaded pipe connection as defined in claim 34, further comprising:
   a tapered metal seal surface on the tubular between the first tapered thread and the second tapered thread, such that a metal-to-metal seal fluidly isolates the first tapered thread from the second tapered thread.

39. A threaded connection as defined in claim 34, further comprising:
   an elastomeric seal carried on one of the connected tubulars for sealing with the other of the connected tubulars.

40. A threaded connection as defined in claim 34, further comprising:
   a dope entrapment cavity between a metal-to-metal seal and the first stepped thread.

41. A threaded connection as defined in claim 34, further comprising:
   a dope entrapment cavity between a metal-to-metal seal and the second stepped thread.

42. A threaded connection as defined in claim 34, further comprising:
   a first dope entrapment cavity between a metal-to-metal seal and the first stepped thread; and
   a second dope entrapment cavity between the metal-to-metal seal and the second stepped thread.

43. A threaded pipe connection as defined in claim 34, wherein the first stepped thread is a dovetail thread.

44. A threaded pipe connection as defined in claim 34, wherein the first thread includes a square wedge thread with wedge flanks substantially perpendicular to an axis of the connection.

45. A threaded pipe connection as defined in claim 34, wherein at least one of the first and second stepped threads is a tapered thread.

46. A threaded pipe connection as defined in claim 45, wherein each of the first and second stepped threads is a tapered thread.

47. A threaded pipe connection having first and second stepped threads on ends of connected tubulars each engaging a mating thread on a coupling, the first thread on a tubular being axially spaced from and having a different nominal diameter than second thread on the tubular, the connection comprising:
   the first thread including wedge threads having a varying thread width along a length of the first thread, such that the wedge threads act to limit rotation and thus axial position of the connected tubulars;
   the second thread including threads that do not act to limit rotation and axial position of the connected tubulars;
   a seal spaced axially between the first and second threads on one tubular and the coupling for sealing between the one tubular and the coupling; and
   another seal between the first and second threads on the coupled tubular and the coupling for sealing between the coupled tubular and the coupling.

48. A threaded pipe connection as defined in claim 47, wherein at least one of the seal and another seal is a metal-to-metal seal formed by tapered surfaces on both the tubular and the coupling.

49. A threaded pipe connection as defined in claim 47, wherein at least one of the seal and another seal is an elastomeric seal for sealing between the tubular and the coupling.

* * * * *

UNITED STATES PATENT AND TRADEMARK OFFICE
CERTIFICATE OF CORRECTION

PATENT NO.    : 6,893,057 B2                                            Page 1 of 1
DATED         : May 17, 2005
INVENTOR(S)   : M. Edward Evans It is certified that error appears in the above-identified patent and that said Letters Patent is hereby corrected as shown below:

Column 5,
Line 22, change "step" to -- stepped --.

Signed and Sealed this

Twelfth Day of July, 2005

JON W. DUDAS
*Director of the United States Patent and Trademark Office*